INVENTOR
LEIF A. KIDE
BY Strauch, Nolan & Neale
ATTORNEYS

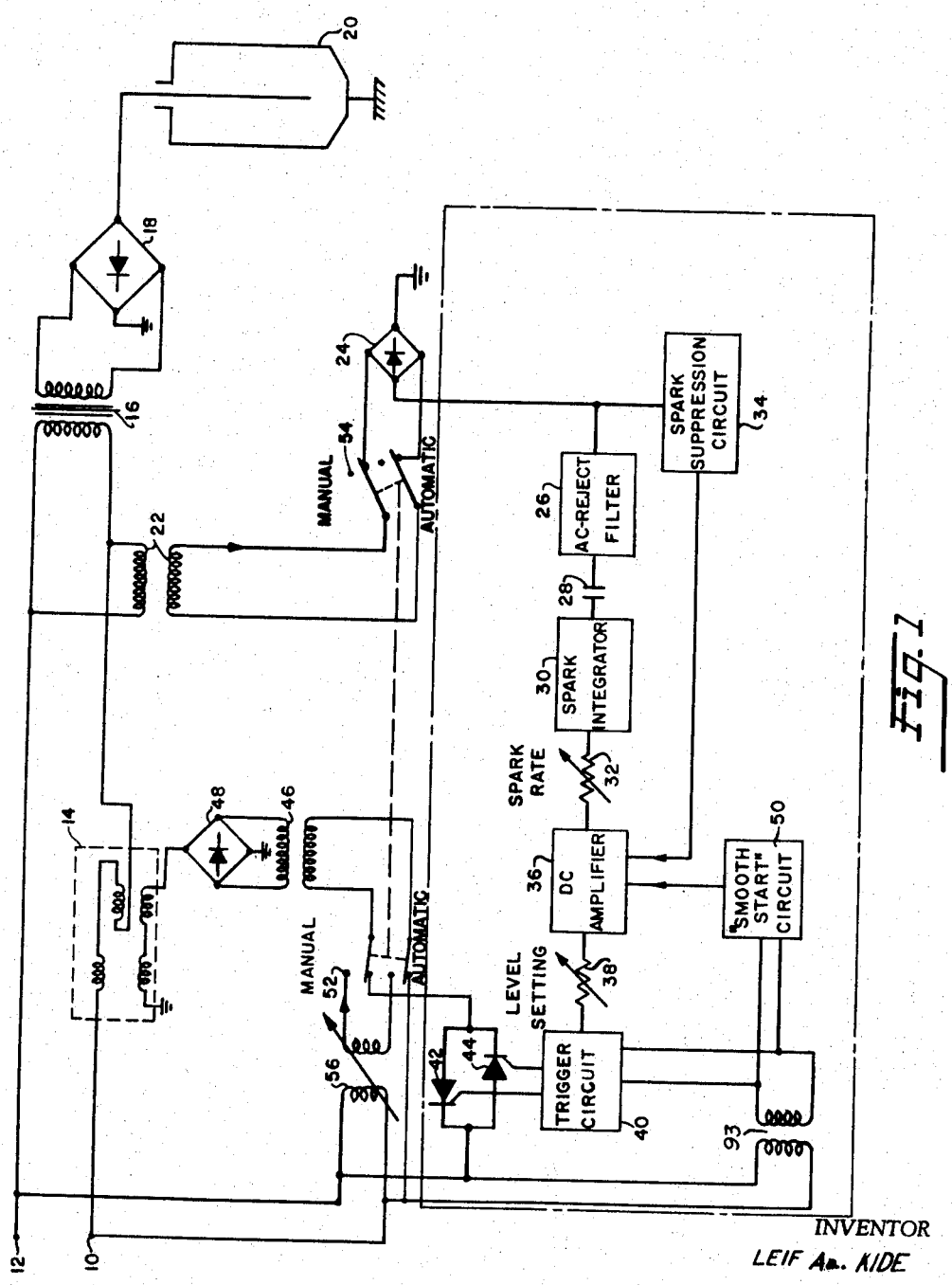

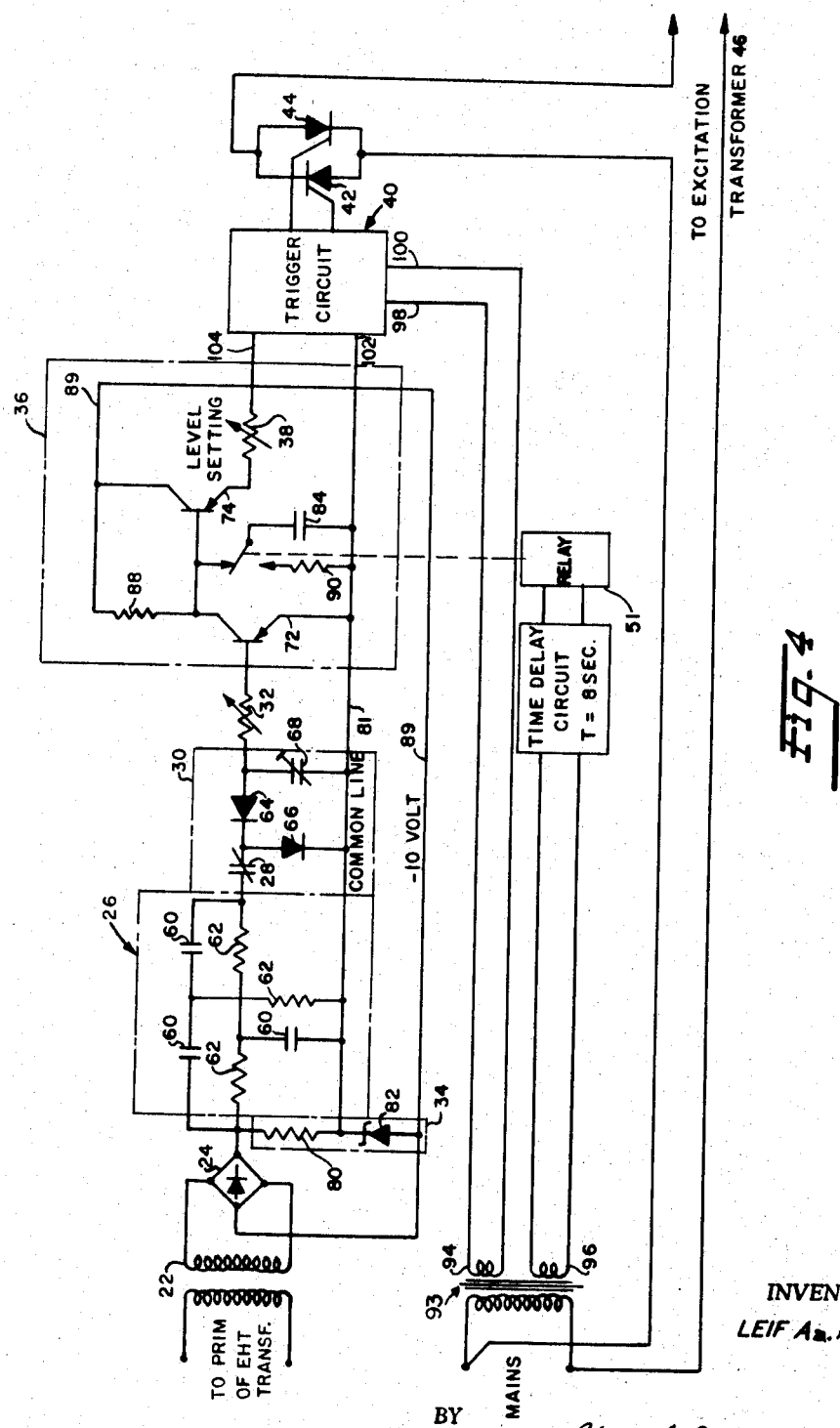

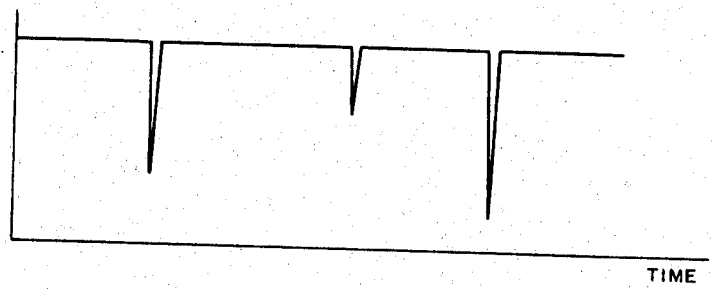
Fig. 5A — DC VOLTAGE INPUT TO PRECIPITATOR (OPEN LOOP)
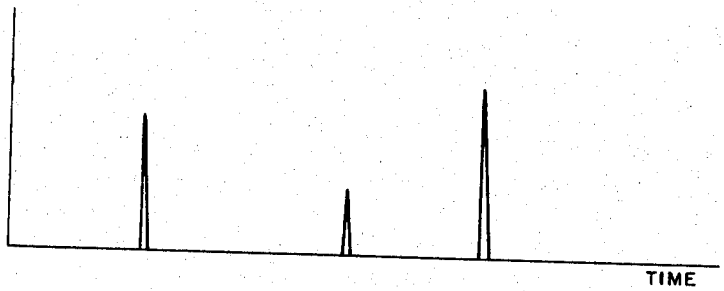
Fig. 5B — VOLTAGE CHANGE APPLIED TO INTEGRATING CIRCUIT
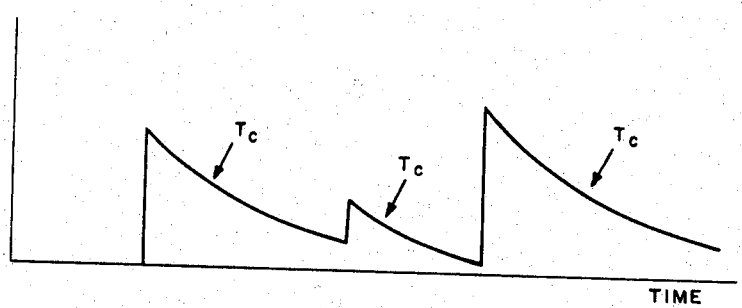
Fig. 5C — DC VOLTAGE ACROSS INTEGRATING CAPACITOR 68
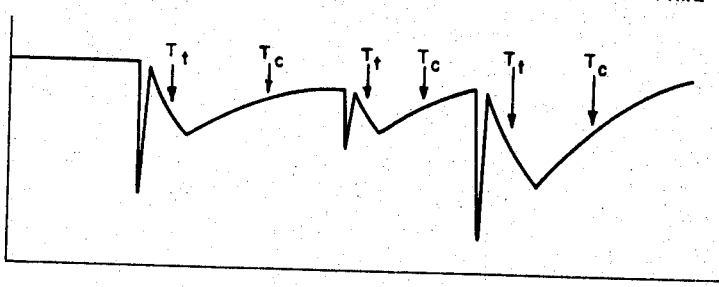
Fig. 5D — DC VOLTAGE INPUT TO PRECIPTATOR (CLOSED LOOP)
$T_t$ = SATURABLE CORE REACTOR TIME CONSTANT
$T_c$ = INTEGRATING CIRCUIT TIME CONSTANT
INVENTOR
LEIF A a. KIDE
BY Strauch, Nolan + Neale
ATTORNEYS March 26, 1968 L. A. KIDE 3,374,609
ELECTROSTATIC PRECIPITATOR CONTROL CIRCUIT
Filed Feb. 10, 1965 5 Sheets-Sheet 5

United States Patent Office 3,374,609
Patented Mar. 26, 1968

3,374,609
ELECTROSTATIC PRECIPITATOR
CONTROL CIRCUIT
Leif Aa. Kide, Goteborg, Sweden, assignor to Aktiebolaget Tudor, Stockholm, Sweden, a corporation of Sweden
Filed Feb. 10, 1965, Ser. No. 431,669
10 Claims. (Cl. 55—105)

ABSTRACT OF THE DISCLOSURE

An apparatus for stabilizing the operation conditions of an electrostatic precipitator wherein an electrical field is maintained by means of an alternating power source which source is connected to the precipitator through a transformer and a saturable core reactor is connected in series between said power source and the transformer primary winding and a voltage generator is provide to control said saturable core reactor and thereby the input to said transformer, said voltage generator being operatively connected and responsive to flashovers in the precipitator.

To secure the maximum efficiency of removal of foreign matter from the gas passing through the electrostatic precipitator, it has been found that the voltage of the power supplied to the precipitator should be increased to a value where flashover or arcing occurs inside the precipitator at a frequent rate, usually about one flashover every second or two. Flashovers are necessarily accompanied by a surge of current and the characteristics of the power supply desirable are such that the high tension voltage drops and then recovers quickly after each flashover to insure that the flashover does not become a steady arc.

When flashover occurs in a precipitator, it is important both from the point of view of the rating of the high voltage rectifier and also from the point of view of erosion of the precipitator wires that the fault current should be limited to a value not greatly in excess of the normal operating current. For this reason, the control of the circuit of the present invention is sensitive to the power input, that is, both the current and the voltage.

In the prior control circuits for electrostatic precipitators, overcurrent relays and contactors were generally used to protect the precipitator from damage due to current increases resulting from flashover in the ionization chamber. Once such overcurrent relays and contactors are actuated as a result of an overcurrent in the precipitator, the precipitator is usually re-connected manually, but only after a predetermined delay and after it has been found safe to restart the precipitator. The present invention is adapted for use with such prior art protective equipment and will offer certain advantages now to be discussed.

When the voltage is suddenly cut off from the ionization chamber, the dust deposited on collecting electrodes is released and tends to drop to the bottom of the ionization chamber. Some of the dust, however, is whirled up due to flowing air or gas currents and if the system is returned to its operating voltage immediately, a new arc may form with the possible risk of an explosion. With the present invention, the voltage and current are so controlled as normally to prevent the voltage from being completely cut off to the ionization chamber as a result of arcing under conditions which would in the past have caused the voltage cut off; and the system is self-correcting so that once the arc has extinguished, the voltage gradually again builds up, all without manual intervention.

If the sparking is too severe or if there is a power arc or a lasting short circuit in the precipitator, a novel spark suppressor circuit is provided which will remove the magnetization current to the saturable core reactor and hence reduce or substantially remove the voltage applied to the precipitator. The spark suppression circuit starts operating when the voltage to the primary winding of the precipitator falls to about 30% of its normal value. This feature, in combination with the other automatic controls of the circuit of the present invention provides full safety precautions for the automatic electrostatic precipitator control circuit.

The principal object of this invention is to provide a novel electrostatic precipitator control system that will stabilize the operating conditions of such precipitators at an optimum point so that the current and voltage are at all times adapted to the precipitator characteristics, the frequency of flashovers in the precipitator ionization chamber is kept at a safe level and such flashovers are prevented from forming arcs of a duration dangerous to the precipitator.

Another object is to provide a novel electrostatic precipitator control system that will immediately reduce current input to the precipitator when a flashover of long duration occurs in the precipitator.

A further object is to provide a novel control circuit for an electrostatic precipitator which accurately controls the voltage input to the precipitator by means varying the firing delay angle of a pair of oppositely poled controlled rectifiers in response to the frequency of flashovers in the precipitators, and yet will reduce the input voltage to the precipitators in the event an arc of continuous duration occurs.

These and other objects will become more fully apparent from the claims and from the following description when read with the appended drawings wherein:

FIGURE 1 is a block diagram of the electrostatic precipitator control circuit of this invention;

FIGURE 4 is a circuit diagram, partially diagrammatic, of the precipitator control circuit of this invention;

FIGURES 5A and 5D show the difference in the instantaneous voltage applied to the input of the precipitator with the control circuit of the present invention inoperative and operative respectively;

FIGURES 5B and 5C show the voltage waveforms at certain locations in the control circuit.

Figure 3:
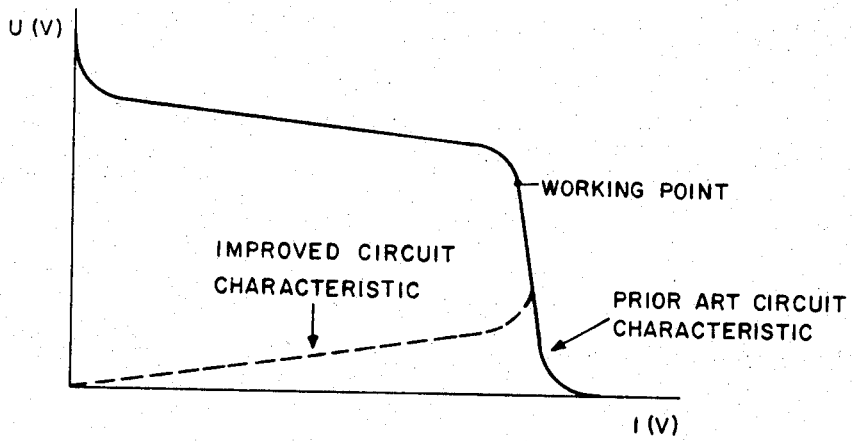
FIGURE 3 is a graph illustrating the voltage-current characteristics of the system under short circuit conditions which shows the effect achieved by the novel spark suppression circuit of the present invention.

Referring now to FIGURE 1, a block diagram of the electrostatic precipitator circuit of this invention is illustrated which comprises A.C. supply terminals 10 and 12, a saturable core reactor 14, a high voltage transformer 16, a bridge rectifier 18, and an electrostatic precipitator 20 connected in a conventional manner. The control voltage to saturable core reactor 14 is applied through transformer 46 and rectifier bridge 48 either manually by variable transformer 56 through switch 52 or automatically when switch 52 is in its illustrated position.

The novel control circuit for the electrostatic precipitator includes a step down transformer 22 having its primary winding in parallel with the primary winding of transformer 16 and its secondary connected to a second rectifier bridge 24 which is connected to a current responsive branch and a voltage responsive branch. The current responsive branch is composed of an A.C. filter 26, a D.C. blocking capacitor 28, a spark integrator 30, and a variable resistance 32 which serves as the spark rate adjustment. The voltage responsive branch, which is connected in parallel to the current responsive branch is composed of spark suppression circuit 34.

Figure 2:
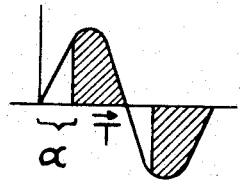
FIGURE 2 is a sine wave curve showing the firing delay angle of the controlled rectifiers.

The output signal from the current and voltage sensitive branches are fed into a combining stage which is D.C. amplifier 36. Amplifier 36, through level setting variable resistance 38, imparts a D.C. voltage as an input signal to trigger circuit 40 for supplying current to the gate control terminals of a pair of controlled rectifiers (SCR's) 42 and 44 which have opposite poles connected together so that one will conduct on the negative portion of the A.C. cycle and the other on the positive. Control is effected by regulating the firing time of the rectifiers on each cycle as is illustrated in FIGURE 2.

Controlled rectifiers 42 and 44 are connected in series between the source of alternating current and the primary of transformer 46, the output of which is applied through rectifier bridge 48 to the control winding of saturable core reactor 14 to provide a means for varying the impedance of the reactor, and hence the voltage input to the primary winding of transformer 16. When no voltage is present in the primary circuit of transformer 46, zero current is provided for the control winding of saturable core reactor 14 and its impedance in series with the primary winding of transformer 16 is then a maximum value. As current through the control winding increases, the impedance of reactor 14 decreases to thereby increase the voltage applied to transformer 16.

Switch 52 is provided to allow either manual control of the D.C. voltage to the control winding reactor 14 or automatic control. Manual control is, of course, well known. The voltage waveform resulting from flashovers of different intensities for manual control is illustrated in FIGURE 5A whereas the corresponding voltage waveform resulting from the same flashovers for the automatic or closed loop control of the present invention is illustrated in FIGURE 5D. To better understand the detailed circuit diagrams of FIGURES 4-6, a brief summary of the operation of the circuit will be given with reference to FIGURE 1.

When power is supplied to terminals 10 and 12, the smooth start circuit 50, via D.C. amplifier 36, slowly causes controlled rectifiers 42 and 44 to begin conducting at an increased amount so that current in a gradually increasing amount is supplied to the control winding of saturable core reactor 14, thereby causing the impedance of reactor 14 to gradually decrease, allowing operating voltage and current supplied to the precipitator 20 to gradually build up. After a delay of about 8 seconds, a time delay relay 51 (see FIG. 4) in smooth start circuit 50 drops out and the system is then in normal operation.

The input voltage to the precipitator is adjusted until flashover in the precipitator occurs at the desired rate. At this point, precipitator 20 draws a very high current causing a transient drop in voltage across the primary windings of both transformers 16 and 22. This reduction in primary voltage is detected in output of bridge circuit 24 and current conduction through the controlled rectifiers 42 and 44 reduced to thereby reduce current flow to the control winding of reactor 14.

Referring now to FIGURE 4, the secondary of transformer 22 is connected to a bridge circuit 24 which has two branches connected to the output. One of these branches can be characterized as being sensitive or responsive to the voltage across the primary winding of transformer 16 and the other branch can be characterized as being sensitive or responsive to the current and particularly current transients resulting from flashovers in the precipitator, that are present in the primary circuit of transformer 16.

The voltage responsive branch includes resistor 80 and Zener diode 82. Line 81 is connected to the junction between resistor 80 and Zener diode 82 and is connected to the emitter terminals of transistor 72 directly and of transistor 74 through a load resistor between terminals 102 and 104 of trigger circuit 40 (which is shown in detail in FIGURE 6) and variable resistor 38. The other terminal of Zener diode 82 is connected to line 89 which may be at a potential of about −10 volts and connected to the collector electrodes of transistor 72 through a resistor 88 and of transistor 74 directly. So long as the voltage across the input terminals of the primary winding 22 remains about 30% of the normal voltage, the normal operating potential for transistors 72 and 74 of D.C. amplifier 36 is provided between lines 81 and 89. If the voltage to the primary winding of transformer 22 drops below this value, the 10 volt drop across Zener diode 82 reduces and current conduction through transistor 74 further reduces and eventually may cut off, thereby stopping the firing of controlled rectifiers 42 and 44.

As pointed out above, this would occur only when there is a condition in the filter whereby an arc of continued duration occurs, and which may ultimately cause a fire if the voltage is not removed. The current to the precipitator as this function of the circuit comes into operation is shown by the dashed line in FIGURE 3.

The current responsive branch, i.e., the branch of the control circuit which optimizes the operating voltage to cause a flashover in the precipitator at the rate of one every few seconds, comprises a twin T capacitor-resistor filter 26 comprised of three capacitors 60 and three resistors 62 for filtering out the high frequency component at the power supply voltage frequency from bridge rectifier 24. Capacitor 28 blocks the D.C. component.

The low frequency ripple component of the output of bridge rectifier 24 is utilized to produce the desired flashover at the rate of one every second or two and is directed to the reverse poled diodes 64 and 66 which are arranged in L-shaped configuration. Diode 66 is a D.C. restoring diode which removes the part of the low frequency ripple which is positive with respect to the common line. The negative parts of the ripple (see FIG. 5b) are passed via diode 64 to integrating capacitor 68 which charges up to the ripple peak and discharges more slowly by way of spark rate resistor 32 and the base emitter impedance of transistor 72 to have a waveform generally as illustrated in FIGURE 5C. A negative charge on capacitor 68 causes the voltage at the base of transistor 72 to rise. Conduction through transistor 72 increases and the voltage at its collector, which is connected through resistor 88 to the −10 volts on lead 89, becomes more positive, thereby causing the voltage at the base of transistor 74 to become more positive. Capacitor 84 is out of the circuit since the switch contact between capacitor 84 and resistor 90 is transferred when relay 51 is energized after the initial 8 second starting period is concluded.

The voltage at the base of transistor 74 becomes more positive, and the control voltage applied to the controlled rectifiers 42 and 44 through trigger circuit 40 is such as to reduce their current conduction. The reduction in current conduction through controlled rectifiers 42 and 44 results in an increase in the angle alpha (see FIG. 2) and consequently decreases the current supplied to the control terminals of saturable core reactor 14.

When sparking in the precipitator ceases, capacitor 68 loses its charge through potentiometer 32 and the base emitter impedance of transistor 72. Consequently, the voltage at the base of transistor 72 falls towards the voltage of line 81 and the voltage at the collector tends to rise to the supply voltage. This rise causes the output signal D.C. voltage to the controlled rectifier trigger circuit 40 to rise and the trigger circuit reduces the delay angle, alpha (see FIG. 2). The control current to the saturable core reaction consequently increases.

The supply voltage to transistors 72 and 74 is derived from a D.C. voltage from rectifier bridge 24 through resistor 80 and Zener diode 82 which make up the spark suppression circuit 34 of FIGURE 1. When the primary voltage varies over a normal range, the proportional variation on the D.C. side of rectifier bridge 24 is entirely across resistance 80, leaving a constant voltage of 10 volts across the Zener diode 82. Resistor 80 and Zener diode 82 may be selected so that any time the primary voltage drops below about 30% of its normal value, the current through Zener diode 82 is interrupted and the voltage across it collapses. This means that if a power arc or a persistent short circuit should appear in the precipitator, the supply voltage to D.C. amplifier 36 would decrease along with the primary voltage and, consequently, the control circuit in the saturable core reactor would, without delay, be interrupted. The normal saturable core reactor characteristic is therefore by this means improved as shown by the dashed curve in FIGURE 3.

The smooth start circuit characteristic as shown in FIGURE 3 prevents the base of transistor 74 from getting the full supply voltage when power is supplied to the circuit. Since storage capacitor 68 would have no charge when the precipitator first starts if a smooth start circuit were not used, transistor 74 would receive the entire supply voltage at its base and cause a sudden rise of voltage in the precipitator.

This smooth start circuit consists of a capacitor 84 which is connected to the base of transistor 74 over a contact of the relay 51 as illustrated in FIGURE 4. When the precipitator is started, the base voltage of transistor 74 cannot rise suddenly to the supply voltage, but will follow the voltage rise on capacitor 84, as the capacitor is being charged through resistor 88. Relay 51 is controlled by a conventional time delay circuit which is preferably adjusted to energize the relay after about eight seconds. When the relay is energized, D.C. amplifier 36 is free to operate automatically and capacitor 84 will charge through its resistor 90. The supply input for relay 51 may be supplied by the secondary winding 96 of transformer 93.

As shown in FIGURE 4, control circuit 40 for controlled rectifiers 42 and 44 is provided with operating voltage from transformer 93 which has its primary winding connnected to terminals 10 and 12 and its secondary winding 94 connected to terminals 98 and 100 of trigger circuit 40.

Figure 6:
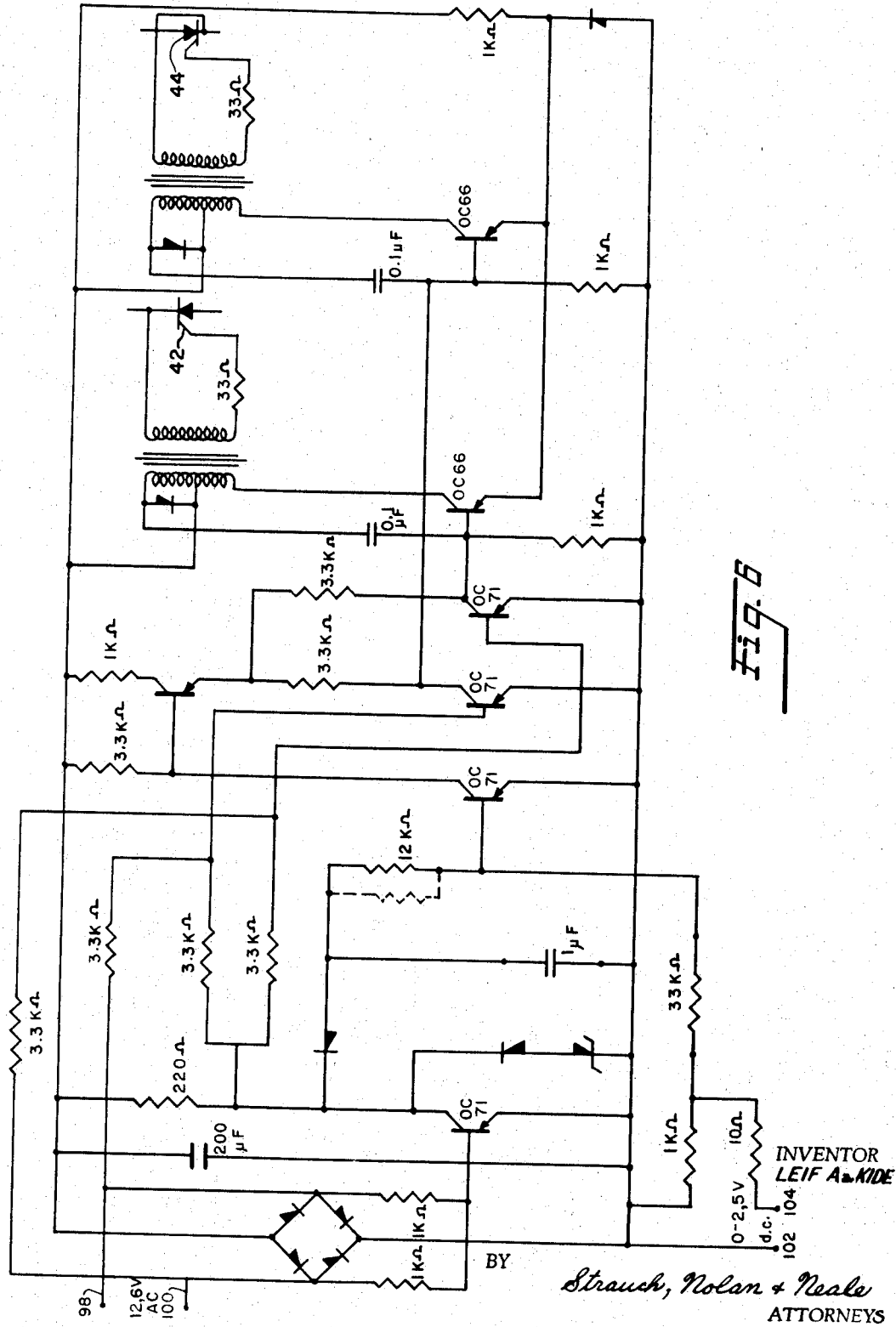
FIGURE 6 is a detailed circuit diagram with operating values of the trigger circuit for the controlled rectifiers used in the control circuit of this invention.

FIGURE 6 is a detailed diagram of a circuit which may be used as trigger circuit 40. Operating voltage is supplied to terminals 98 and 100 which are shown at the upper left hand corner of FIGURE 6, as well as in FIGURE 4. A D.C. signal voltage is received through terminals 102 and 104 from amplifier 36 (FIGURES 1 and 4). Trigger circuit 40 converts the D.C. signal into a trigger output signal that is applied between the control and cathode terminals of controlled rectifiers 42 and 44 as illustrated at the upper right hand corner of FIGURE 6.

In the input D.C. signal on leads 102 and 104 decreases, the delay angle alpha for the time of firing controlled rectifiers 42 and 44 increases. Thus, the controlled rectifiers conduct current in an amount proportional to the D.C. signal input or leads 102 and 104 to trigger circuit 40. This provides a precision means of controlling the sparking rate and voltage supply to the precipitator through saturable core reactor 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for stabilizing the operation conditions of an electrostatic precipitator wherein an electrical field is maintained by means of an alternating current power source connected through a transformer having a primary winding and a secondary winding including a rectifier, said apparatus comprising a saturable core reactor having a main winding connected in series between said power source and said transformer primary winding and a control winding having a pair of terminals; a control voltage generator including a pair of controlled rectifiers connected in parallel and poled in opposite directions; means connecting said controlled rectifier pair in series between a source of alternate voltage and said control winding terminals to regulate the control winding current; and circuit means responsive to voltage fluctuations across the transformer primary winding that result from a flashover in the precipitator for varying the length of the portion of each cycle of alternating voltage that said controlled rectifiers are made conductive.

2. The apparatus as defined in claim 1 wherein the last mentioned circuit means comprises means for producing a voltage responsive to transient voltages appearing across the transformer primary winding which result from flashovers in the precipitator, means for generating a direct voltage which varies in magnitude in accordance with the intensity and frequency of flashovers; and means for applying said direct voltage to the input of the control voltage generator.

3. Apparatus for stabilizing the operating conditions of an electrostatic precipitator wherein an electrical field is maintained by means of an alternating current power source connected through a transformer having a primary winding and a high voltage secondary winding including a rectifier; means in said primary winding circuit for varying the voltage applied to said primary winding, said means having a pair of control voltage terminals and being controllable in response to a direct voltage applied between said control voltage terminals; a control voltage generator including a pair of controlled rectifiers connected in parallel and poled in opposite directions, means connecting said pair of controlled rectifiers in series between an alternating voltage source and said control voltage terminals; and circuit means operatively connected to said controlled rectifiers and to said electrostatic precipitator for making said rectifiers conductive for a portion only of each cycle of said alternating voltage to produce said control voltage, said last mentioned circuit means producing electrical signals in response to flashovers in the precipitator and applying said electrical signals to said pair of controlled rectifiers to reduce the length of the portion of each cycle said controlled rectifiers are made conductive to thereby reduce the voltage output of the control voltage generator and thus reduce the voltage applied to said transformer primary circuit.

4. The apparatus as defined in claim 3 wherein said last mentioned circuit means further comprises a circuit element connected to be responsive to transient voltages across said transformer primary winding that result from flashovers in the precipitator; a current sensitive circuit branch connected to the output of said element comprising an integrating circuit including a capacitor having a time constant long relative to the reciprocal of a predetermined value of flashover rate, a pair of amplifying stages each containing a transistor, means connecting the input of one of said amplifying stages to be responsive to the voltage appearing across said capacitor, means connecting the input of the other of said stages to the output of said one amplifying stage, and means connecting the output from said other amplifying stage to said control voltage generator.

5. Apparatus as defined in claim 4 together with a smooth start circuit comprising a further capacitor having one terminal connected to a point of fixed potential and the other terminal connected to one terminal of a switch contact, means connecting a second terminal of said switch contact to the input of said other of said amplifying stages, said switch contact being closed during start up of the control circuit; and time delay means for thereafter opening said switch contact.

6. Apparatus for stabilizing the operating conditions of an electrostatic precipitator wherein an electrical field is maintained by means of an alternating current power source connected through a transformer having a primary winding and a high voltage secondary winding including a rectifier; means in said primary winding circuit for varying the voltage applied to said primary winding, said means having a pair of control voltage terminals and being controllable in response to a direct voltage applied between said control voltage terminals; a control voltage generator connected to said control voltage terminals including a pair of controlled rectifiers connected in parallel and poled in opposite directions, said rectifiers being connected to a source of alternating voltage to be made conductive for a portion only of each cycle of said alternating voltage to produce said control voltage; and a control circuit connected to be responsive to transient voltages across said transformer primary winding comprising a current sensitive branch that is responsive to both the severity of the flashover and to a flashover rate in the precipitator value for reducing the length of the portion of each cycle said controlled rectifiers are made conductive and a voltage sensitive branch for rendering said controlled rectifiers non-conductive in response to a severe short circuit of prolonged duration in the precipitator.

7. Apparatus as defined in claim 6 wherein the current sensitive branch comprises an integrating circuit including a capacitor having a time constant long relative to the reciprocal of a predetermined value of said flashover rate, a pair of amplifying stages each containing a transistor, means connecting the input of one of said amplifying stages to be responsive to the voltage appearing across said capacitor, means connecting the input of the other of said stages to the output of said one amplifying stage, and a trigger circuit connected between the output of said other amplifying stage from generating the timing signals that cause firing of the controlled rectifiers.

8. Apparatus as defined in claim 7 together with a smooth start circuit comprising a further capacitor having one terminal connected to a point of fixed potential and the other terminal connected to one terminal of a switch contact, means connecting a second terminal of said switch contact to the input of said other of said amplifying stages, said switch contact being closed during start up of the control circuit; and time delay means for thereafter opening said switch contact.

9. Apparatus for stabilizing the operating conditions of an electrostatic precipitator wherein an electrical field is maintained by means of an alternating current power source connected through a transformer having a primary winding and a high voltage secondary winding including a rectifier; means in said primary winding circuit for varying the voltage applied to said primary winding, said means havng a pair of control voltage terminals and being controllable in response to a direct voltage applied between said control voltage terminals; means responsive to voltage transients caused by flashovers in said precipitator and to a reduction in voltage due to an arc of sustained duration for producing a variable voltage that is connected to said control winding terminals comprising a second transformer having its primary winding connected across said first mentioned primary winding and a secondary winding in a circuit containing a full wave rectifier bridge; a first resistor and Zener diode connected across output terminals of said rectifier bridge; an R–C filter connected across said first resistor and operable to remove ripple at the power supply voltage frequency while passing transient voltages occurring as a result of flash-overs in the precipitator; a pair of amplifying stages each including a transistor connected to be supplied with operating voltage determined by the voltage drop across said Zener diode; a D.C. blocking capacitor connected to the output of said filter; an integrating capacitor and and diode series circuit arrangement connected to said D.C. blocking capacitor for producing a charge on said integrating capacitor which increases with an increase in flashover intensity and repetition rate; means connecting the first of said pair of amplifying stages to be responsive to the charge on said integrating capacitor; means connecting the second of said pair of amplifying stages to the output of said first amplifying stage; and means responsive to the current in said second amplifying stage for producing said variable voltage that is applied to said control winding terminals.

10. Apparatus as defined in claim 9 together with a smooth start circuit comprising a further capacitor having one terminal connected to a point of fixed potential and the other terminal connected to one terminal of a switch contact means connecting a second terminal of said switch contact to the input of said other of said amplifying stages, said switch contact being closed during start up of the control circuit; and time delay means for thereafter opening said switch contact.

References Cited

UNITED STATES PATENTS

| | | | |
|---|---|---|---|
| 2,897,914 | 8/1959 | Camp et al. | 55—105 |
| 2,961,577 | 11/1960 | Thomas et al. | 55—105 |
| 2,992,699 | 7/1961 | Jarvinen | 55—105 |
| 3,147,094 | 9/1964 | Hall et al. | 55—105 |
| 3,241,053 | 3/1966 | Woodley | 323—89 |
| 3,247,451 | 4/1966 | Hauck | 323—66 |

JOHN F. COUCH, *Primary Examiner.*

W. E. RAY, *Examiner.*